US006728782B1

United States Patent
D'Souza et al.

(10) Patent No.: US 6,728,782 B1
(45) Date of Patent: Apr. 27, 2004

(54) METHOD OF VERIFYING NEWLY PROVISIONED CUSTOMER NETWORK ROUTE ADVERTISEMENTS

(75) Inventors: Kevin L D'Souza, Pittsburgh, PA (US); Han Q. Nguyen, Marlboro, NJ (US); Leah Zhang, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/576,468

(22) Filed: May 23, 2000

(51) Int. Cl.⁷ .............................................. G06F 15/173
(52) U.S. Cl. ....................... 709/242; 709/238; 709/239
(58) Field of Search ................................ 709/242, 238, 709/239, 240, 241

(56) References Cited

U.S. PATENT DOCUMENTS

| | | | | |
|---|---|---|---|---|
| 5,347,633 A | * | 9/1994 | Ashfield et al. | 709/238 |
| 5,675,741 A | | 10/1997 | Aggarwal et al. | |
| 6,032,184 A | | 2/2000 | Cogger et al. | |
| 6,317,684 B1 | * | 11/2001 | Roeseler et al. | 701/202 |
| 6,374,303 B1 | * | 4/2002 | Armitage et al. | 709/242 |

OTHER PUBLICATIONS

Lewis et al., "Multihoming Your Internet Service With BGP", Network Computing, 1997, No. 813, p. 118.*
Application Ser. No. 09/116129; Filed Jul. 15, 1998 (Inventor Kevin L. D'Souza) (IDS No. 113154) Title: Method And Apparatus For Fault Detection And Isolation In Data Networks.

Database Internet Online! Network Working Group; RFC 1771, Mar. 1995, pp. 1–57, Y. Rekhter, T. Li: "A Border Gateway Protocol 4 (BGP–4)" retrieved from http://www-.faqs.org/RFCS/Database accession No. rfc1771.html XP002226832.

Database Internet Online! Network Working Group; RFC2650, Aug. 1999, pp. 1–26, D. Meyer et al.: "Using RPSL in Practice" retrieved from http://www.faqs.org/RFCS/Database accession No. rfc2650.html XP002226833.

Copy of European Search Report, dated Jan. 30, 2003, regarding European Patent Application No. 01111281.0.

* cited by examiner

Primary Examiner—Krisna Lim

(57) ABSTRACT

Route advertisement requests made by a customer are received at route provisioning center (20) to effect either advertisement of a newly provisioned route or withdrawal of an existing route. In the case of a request to advertise a newly provisioned route, the request is subjected to validation, and if unable to be validated, the request is rejected. Upon validation of a new route advertisement, or following receipt of a request to withdraw an existing route advertisement, the customer-entered request is entered into an official routing database (26) for subsequent propagation to network access providers (14, 16 and 18). Periodically, a check is made to verify that the customer-entered request remains active.

16 Claims, 1 Drawing Sheet

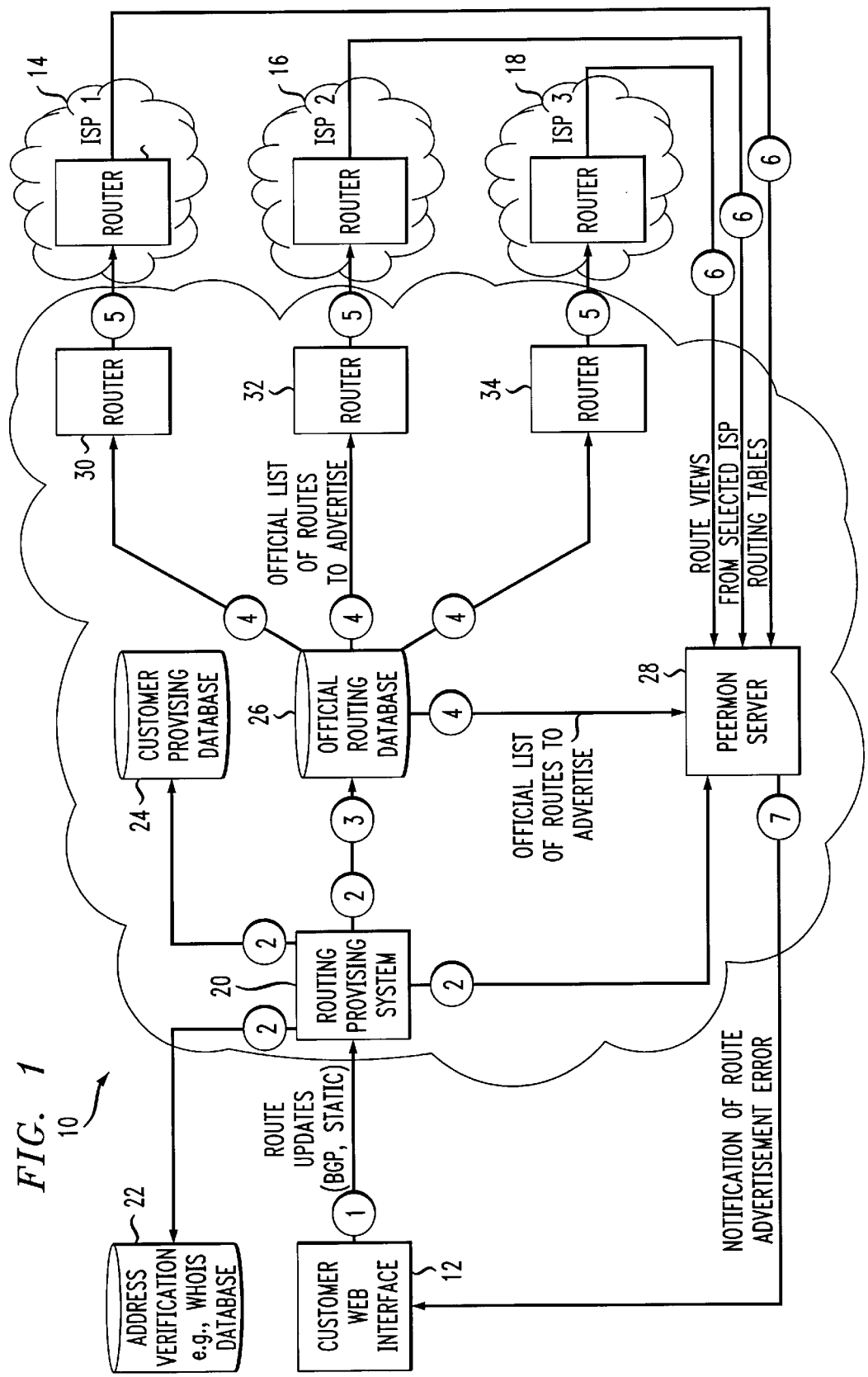

METHOD OF VERIFYING NEWLY PROVISIONED CUSTOMER NETWORK ROUTE ADVERTISEMENTS

TECHNICAL FIELD

This invention relates to a technique for assuring that a route advertisement made by a customer remains accurate to assure that packets inbound to the customer on an advertised route are received.

BACKGROUND ART

The tremendous popularity of the Internet has led to a surge in data communications traffic both on the Internet itself, and on connecting networks. Consequently, many Internet Service Providers (ISPs) that provide access to the Internet, such as AT&T Worldnet, have themselves become larger, offering more available routes. With more routes available through an ISP to a given customer, the likelihood of a blocked route impairing transmission is reduced.

In many instances, a customer served by a particular ISP will advertise, (i.e., notify) senders of data of available routes through the customer-servicing ISP so that inbound data from a sender will reach the customer. Once a customer advertises a particular route, then that route should remain available without modifications by the customer-servicing ISP as well as other ISPs routing traffic thereto. Modifications made to an advertised route will likely cause inbound packets destined to a customer across that route to miss their intended destination.

Thus, there is a need for a technique assuring that route advertisements by a customer appear faithfully beyond the customer-servicing ISP to other ISPs without modification.

BRIEF SUMMARY OF THE INVENTION

Briefly, in accordance with a preferred embodiment of the invention, there is provided a method for verifying the addition of a newly provisioned customer route as well as withdrawal of a previously provisioned route. The method commences upon receipt at a route provisioning system of new route information from a customer or upon a request to withdrawal of an existing advertisement. Upon receipt of a new route advertisement request, the new route is validated, and if unable to be verified is then rejected. (Generally, there is no need to verify withdrawal of an existing route although validation of the customer seeking withdrawal may prove useful.) Thereafter, the new route (or the withdrawal of an existing route) is entered into an official routing database and the information is thereafter made available both to the customer-servicing ISP as well as external ISPs. Finally, a check is made of all ISPs that the new route address (or withdrawal of the old address) is effective.

BRIEF DESCRIPTION OF THE DRAWING

FIG. 1 discloses a block schematic diagram of a system for practicing the method for the invention.

DETAILED DESCRIPTION

FIG. 1 discloses a communications network 10 having the capability of verifying a new route advertisement or withdrawal of an existing route advertisement made by a customer 12 to one or more network access providers, in the form of Internet Service Providers 14, 16, and 18 that each provide access to the Internet. Typically, the customer 10 will advertise available routes for receiving inbound data from senders of such data. If the ISP servicing the customer (e.g., ISP 14) or any other ISP (e.g., ISPs 16 and 18) makes a modification to that route without altering others of that modification, then the advertised route may become incorrect so that inbound data routed on the advertised route may not reach the customer 12.

The method of the invention advantageously verifies new route advertisements (or withdrawal of existing route advertisement) by the following steps that are numerically designated in FIG. 1:

Step 1

The customer 10 enters into a route provisioning system 20 information of a new route (or withdrawal of an existing route) for advertisement to the Internet via ISPs 14, 16 and 18. The customer may advertise such a new route or route withdrawal statically, or via the Border Gateway Protocol (BGP). Typically, the customer 10 enters the route advertisement or route withdrawal into the Route Provisioning System 20 via a web interface although the customer could enter such information in other ways.

Step 2

The Route Provisioning System 20 performs an authentication check on a new route entered by the customer 12. The verification includes the following checks The originating customer 12 officially owns the network address. (To that end, the Route Provisioning System 20 queries an Internet Network Address Registry database 22, such as the "WHOIS" database currently in existence)

There is no conflict between the new network address and any previously provisioned network address. (To that end, the Route Provisioning System 20 queries an internal Customer Provisioning Database 24 and an Official Routing Database 26.)

There exists an alternate route advertisement for the new network address, (i.e., the AS_ORIGIN (the originating Autonomous System Number for the customer network of that route advertisement corresponds to the ASN (Autonomous Systems Number) entered by the customer for that network address advertisement). (To make this determination, the Route Provisioning System 20 launches a query to a Peer Monitoring (PEERMON) Server 28 that collects the Internet Routing tables from the ISPs 14, 16 and 18.)

Other local policies are satisfied. For example some ISPs limit the size of the route advertised by a customer such that the route is no larger than 24 bits (/24).

If the route entered by the customer 12 to the Route Provisioning System 20 fails any of the above-described validation steps, the Route Provisioning System rejects the route advertisement.

Withdrawal of an existing route advertisement generally requires no verification. Thus, step 2 becomes unnecessary under such circumstances. However, the Route Provisioning System 20 may elect to validate the customer requesting withdrawal of an advertised route to assure that the customer seeking such withdrawal is authorized to do so.

Step 3

After validating a new customer-entered route advertisement, the Route Provisioning System 20 enters the validated new network address into the Official Routing Database 26 for the ISPs. A withdrawal of an existing advertisement is likewise entered into the Routing Database 26 for the ISPs.

Step 4

After receiving the validated customer-entered route information (either a new route or a withdrawal of an existing route), the Official Routing Database provides the newly provisioned route advertisement (or withdrawal of an existing route) to the PEERMON server 28, as well as to one or more internal ISP Routers, such as routers 32, 34 and 26, that are responsible for external advertisements to the ISPs 14, 16 and 18.

Step 5

The IPS internal routers 30, 32 and 34 make the new route advertisement (or withdrawal of an existing route) available to the ISPs 14, 16 and 18 via peering connections established with those ISPs. It this step that constitutes actual advertisement of the new network address or withdrawal of an existing address, in the Official Routing Database 26 to the ISPs 14, 16 and 18.

Step 6

At periodic intervals, the PEERMON server 28 automatically examines the routing table from at least one, and preferably all of the external ISPs (i.e., ISPs 14, 16 and 18) to verify that the new network address or withdrawal of an existing route advertisement appears as advertised by the originating ISP. Typically, the PEERMON server 28 accomplishes such examination in the manner described in U.S. patent application Ser. No. 09/495,112, filed Feb. 1, 2000, currently pending, in the name of Kevin L. D'Souza for "Method for Detecting Route Advertisement Violations in a Network Of Interconnected Peers", and assigned to AT&T Corp. (incorporated by reference herein).

Step 7

Each time the PEERMON server 28 verifies the presence of the new route (or withdrawal of the existing route) within a particular ISP's routing table, the server notifies that ISP and the customer 12. As discussed above, the PEERMON server 28 continuously and automatically monitors for errors in route advertisements (both new routes sand withdrawals of existing routes) on an on-going basis and notifies the customer and the originating ISP for appropriate attention.

The foregoing describes a technique for verifying route-advertising modifications.

The above-described embodiments merely illustrate the principles of the invention. Those skilled in the art may make various modifications and changes that will embody the principles of the invention and fall within the spirit and scope thereof.

What is claimed is:

1. A method for verifying and implementing a requested modification to an advertised route in a data communications network, comprising the steps of:
   receiving at a network provisioning system a customer-generated route advertisement modification request to cause one of (a) provisioning a new route advertisement or (b) withdrawal of an existing route advertisement;
   validating the new route advertisement when the customer-generated route advertisement modification constitutes provisioning of said new route advertisement and rejecting said new route advertisement if unable to be verified;
   entering the customer-generated route advertisement modification into an official routing database to make such route advertisement modification available to providers of network access; and
   periodically checking at least one of such providers of network access to verify whether such route advertisement modification remains effective.

2. The method according to claim 1 wherein the step of validating a new route advertisement includes the steps of:
   (a) checking whether the customer owns a network address associated with the new route advertisement;
   (b) checking whether a conflict exists between any existing route advertisement and the new route advertisement;
   (c) checking whether an alternate route advertisement corresponds to the new route advertisement; and
   (d) checking whether the new route advertisement violates a local routing policy.

3. The method according to claim 2 wherein the step of checking whether the customer owns the network address associated with the new route advertisement includes the step of querying a database containing a registry of network addresses.

4. The method according to claim 2 wherein the step of checking whether a conflict exists between any existing route advertisement and the new route advertisement includes the step of querying the official routing database and a customer provisioning database.

5. The method according to claim 1 wherein the customer enters the route advertisement modification via a web interface.

6. The method according to claim 1 wherein the customer enters the route advertisement modification using via a Border Gateway Protocol.

7. The method according to claim 1 wherein the customer enters the route advertisement modification statically.

8. A method for verifying and implementing a request to advertise a newly provisioned route in a data communications network, comprising the steps of:
   receiving at a network provisioning system a customer-generated request to advertise a newly provisioned route;
   validating the advertisement for the newly provisioned route and rejecting said route advertisement if unable to be verified;
   entering the customer-generated route advertisement into an official routing database to make such route advertisement available to providers of network access; and
   periodically checking at least one of such providers of network access to verify whether such route advertisement remains effective.

9. The method according to claim 8 wherein the step of validating a new route advertisement includes the steps of:
   (a) checking whether the customer owns a network address associated with the new route advertisement;
   (b) checking whether a conflict exists between any existing route advertisement and the new route advertisement;
   (c) checking whether an alternate route advertisement corresponds to the new route advertisement; and
   (d) checking whether the new route advertisement violates a local routing policy.

10. The method according to claim 9 wherein the step of checking whether the customer owns the network address associated with the new route advertisement includes the step of querying a database containing a registry of network addresses.

11. The method according to claim 9 wherein the step of checking whether a conflict exists between any existing route advertisement and the new route advertisement includes the step of querying the official routing database and a customer provisioning database.

12. The method according to claim 8 wherein the customer enters the route advertisement modification via a web interface.

13. The method according to claim 8 wherein the customer enters the route advertisement modification using via a Border Gateway Protocol.

14. The method according to claim 8 wherein the customer enters the route advertisement modification statically.

15. A method for verifying and implementing a requested withdrawal of an advertised route in a data communications network, comprising the steps of:

receiving at a network provisioning system a customer-generated request to withdraw an existing route advertisement;

entering the customer-generated route withdrawal request into an official routing database to make such route withdrawal request to providers of network access; and periodically checking at least one of such providers of network access to verify whether such route withdrawal request remains effective.

16. The method according to claim 15 further including the step of verifying whether the customer making the route withdrawal request is authorized to do so.

* * * * *